United States Patent [19]

Wise et al.

[11] Patent Number: 4,738,489
[45] Date of Patent: * Apr. 19, 1988

[54] CHILD'S CAR SEAT RESTRAINT SYSTEM

[75] Inventors: Robert D. Wise, Akron; Robert L. Quinlan, Jr., Barberton; Charles W. Lauro, Akron; Sidney H. Bradd, Jr., Solon, all of Ohio

[73] Assignee: Gerber Products Company, Fremont, Mich.

[*] Notice: The portion of the term of this patent subsequent to Apr. 7, 2004 has been disclaimed.

[21] Appl. No.: 940,674

[22] Filed: Dec. 11, 1986

Related U.S. Application Data

[63] Continuation of Ser. No. 698,010, Feb. 4, 1985, Pat. No. 4,655,506.

[51] Int. Cl.⁴ .............................................. A47D 15/00
[52] U.S. Cl. .................................... 297/487; 297/250; 297/467
[58] Field of Search ...................... 297/467, 488, 487; 248/408

[56] References Cited

U.S. PATENT DOCUMENTS

| | | | |
|---|---|---|---|
| 1,756,210 | 4/1930 | Racz | 248/408 |
| 2,805,081 | 9/1957 | Frimet | 297/487 X |
| 3,259,428 | 7/1966 | Wenger et al. | 297/186 |
| 3,563,600 | 2/1971 | Converse | 297/467 |
| 4,303,272 | 12/1981 | Berggren | 297/467 |
| 4,509,798 | 4/1985 | Strothers | 297/487 |
| 4,655,506 | 4/1987 | Wise et al. | 297/467 |

Primary Examiner—Francis K. Zugel
Attorney, Agent, or Firm—Townsend and Townsend

[57] ABSTRACT

A child's car seat which includes a rigid, T-shaped shield member which forms the frontal restraint barrier across the chair structure. The shield member includes a lock mechanism between the vertical crotch member and the bottom of the chair structure which can be operated with one hand. The shield member is adjustably and rotatably affixed to the sides of the chair structure to permit rotation of the shield member above the child's head. Shoulder harness straps emanating from the back of the chair structure are automatically positioned as the shield member is lowered into place. The shield member, lock mechanism and shoulder harnesses are adjustable to accommodate infants and toddlers. The shoulder harness straps interact with the lock mechanism of the shield member such that once the lock is engaged, the shoulder harness straps cannot be adjusted.

3 Claims, 2 Drawing Sheets

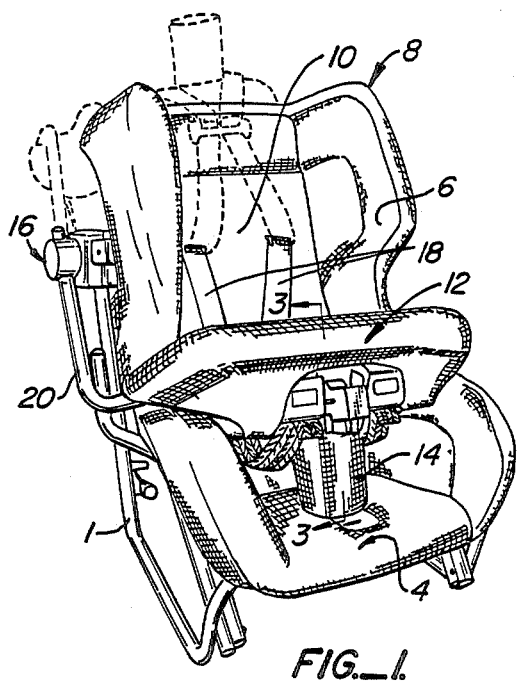
FIG.__1.
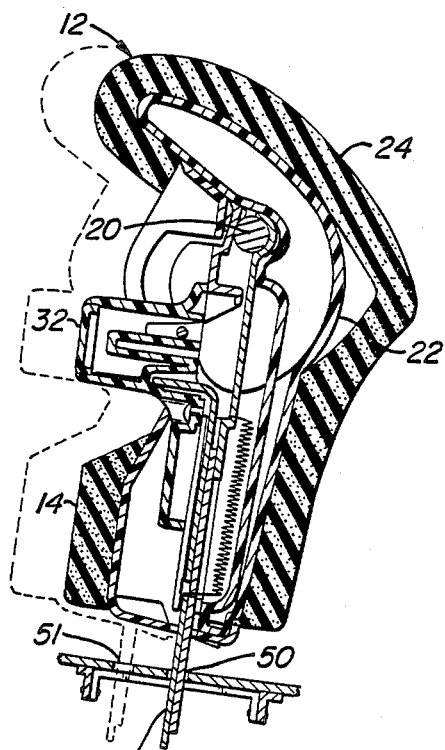
FIG.__3.
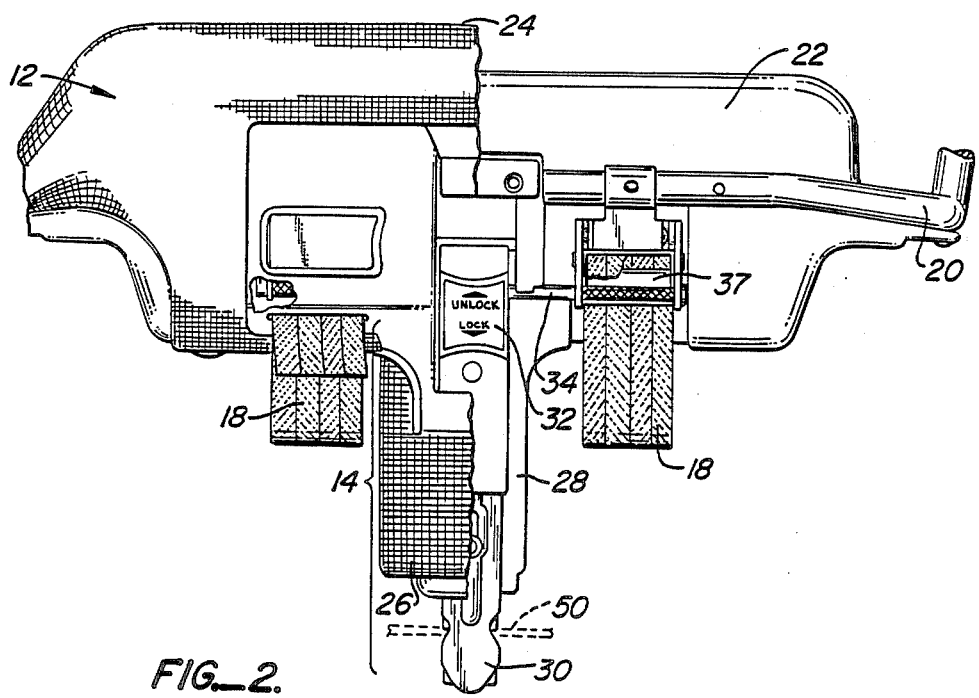
FIG.__2.

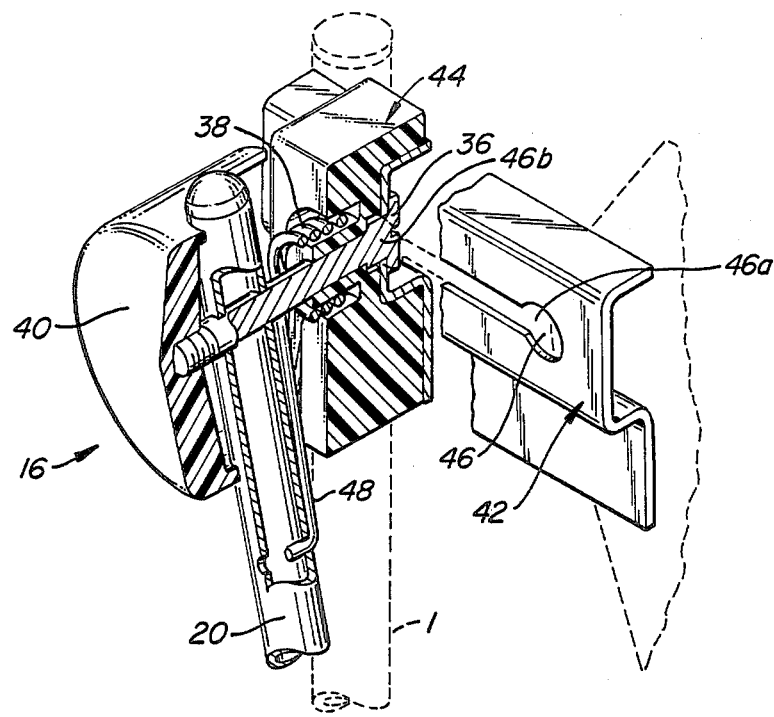
FIG._4.

CHILD'S CAR SEAT RESTRAINT SYSTEM

This is a continuation of application Ser. No. 698,010, filed Feb. 4, 1985 now U.S. Pat. No. 4,655,506.

BACKGROUND OF THE INVENTION

The present invention relates to an improved restraining system incorporated into a child's car seat. The present device permits a child to be placed and safely restrained within the car seat with a minimum of adjustments and locking devices. Indeed, the restraint system of the present invention can be engaged easily with one hand, leaving the other hand free to contend with the often uncooperative occupant of the car seat.

In the past, child car seats have involved harness systems comprised of numerous straps which have the tendency to present binding and cutting edges to the child. The crotch strap of such car seats, being formed of a flexible and relatively narrow strap, is often kicked aside by the child, thus requiring a renewed attempt to position the child properly. In addition, the straps often twist, tangle or fold along their lengths, further causing discomfort to the child. Proper adjustments of the straps to assure maximum security have often been neglected by users of the car seats because such adjustments are often complex and numerous.

Since children develop quickly from infants to toddlers, a child's car seat must have the capacity to adapt to the child's increasing size without sacrificing the proper security of the safety restraint system. When the restraining system has not been properly engaged, it should be made readily apparent to the responsible adult. To assure and encourage consistent use of the car seat, it should also be easy to use, easy to adjust, and economical.

SUMMARY OF THE INVENTION

The car seat of the present invention features a restraining system which can be adjusted and locked into position with only one hand. It adjusts to accommodate both infants and toddlers with proper security. The system requires minimal adjustments and only two shoulder straps which are automatically adjusted before the lock is activated.

The frame and chair portion of the car seat are known in the prior art. The chair is supported by the frame structure along the sides and back and can be mounted either facing towards the seat of the car (for infants) or facing forward (for toddlers) using the auto safety belts.

The chair portion of the child's car seat in the preferred embodiment is a unitary molded structure with padding. Minimally, the chair body defines a back support and a bottom area, and in the preferred embodiment, has winged sides to enclose the child.

The present invention provides an improved restraint system which includes a T-shaped shield to form the frontal barrier of the child's car seat.

The T-shaped shield provides a generally horizontal portion which forms a padded curved surface to cushion the child. The generally vertical portion of the shield forms the rigid crotch piece of the frontal barrier.

A lock secures the bottom of the crotch piece in position on the bottom of the chair body. The latch for the lock is a push button located on the outer surface of the shield. It can easily be actuated to lock the shield in place with one hand, yet is placed so that it is not accidentally opened by the child in the car seat.

To adjust the chair to accommodate a child from infancy to the toddler stage (up to 40 lbs.), the side mounts of the frontal barrier and the lock mechanism of the crotch piece cooperate to adjust the distance between the back of the chair and the shield.

The shield is rotatably mounted to the sides of the chair frame so that it can be swung upwardly beyond the top of the chair, leaving the chair area clear. The mounting of the shield to the chair frame may also include springs so that the shield biases upwardly over the child's head when the shield is not locked. Such spring biasing makes it apparent when the child is not properly secured in the chair.

In the preferred embodiment, the T-shaped shield is connected to the chair frame along the sides of the car seat via a rigid continuous tube member which defines L-shaped arms along the sides of the chair and a U-shaped frame across the top face of the horizontal portion of the frontal shield. The connection between the tube member and the chair frame is slidably adjustable to vary the distance between the shield and the chair body.

The lock in the crotch piece mates with the chair at various positions spaced from the back of the chair to adjust the capacity of the car seat.

The shoulder straps restrain the upper body of the child. Two shoulder straps emanate from and through slots provided in the back of the chair. A common buckle along the strap length holds the straps together along the child's chest. The upper ends of the shoulder straps are fastened securely via a buckle arrangement to the framework behind the slots in the chair body. Slots are provided at various distances from the chair bottom along the chair back so that the straps can be modified to accommodate changes in the child's height. To rethread the straps through the seats, the upper ends of the straps are unfastened from the frame, threaded through the appropriate slots, and refastened to the frame.

The lower ends of the shoulder straps are threaded through the under side of the horizontal portion of the shield along either side of the crotch piece. The ends of the straps terminate in loops which extend downwardly from the shield. These looped ends provide the slack in the straps to permit passive automatic adjustment of the shoulder straps when the child is placed in the car seat.

The straps are threaded over a knurled shaft which cooperates with the latching mechanism of the lock such that the strap webbing material is trapped by the shaft and locked in place once the crotch piece is locked. While the crotch piece is unlocked, the straps are untethered and can freely pass across the shaft.

To assure proper adjustment of the restraint system, the straps need only to be pulled taut while the chair is in the open position. While the shield is lowered over the child's head, the straps will extend to accommodate the torso of the child. Once the crotch piece is locked, the straps are locked into place.

The present invention contains features which address all of these concerns. These and other features of the invention will become more apparent from the following description and drawings.

BRIEF DESCRIPTION OF THE DRAWINGS

FIG. 1 is a perspective illustration of the invention in the closed position, with the open configuration indicated by the view shown in broken lines.

FIG. 2 is a front view of the shield with a partial cutaway view of the internal structure.

FIG. 3 is a cross-sectional view of the shield taken along line 3—3 in FIG. 1.

FIG. 4 is an enlarged isometric sectional view.

DETAILED DESCRIPTION OF THE EMBODIMENT

The general arrangement of the child's car seat can be seen in FIG. 1. The support framework is generally designated as 1. The unitary molded chair body is designated as 8, and is composed of a bottom portion 4, a back section 10 and winged sides 6 to enclose the child. The interior of the chair body is generally padded with deformable materials to cushion the child. The frontal barrier of the car seat is formed by the T-shaped shield 12. The shield 12 is incorporated into the car seat at the side mounts 16 of the shield's tube member 20 and the engagement of the vertical crotch piece 14 with the chair bottom 4.

The features of the shield 12 are more apparent in FIGS. 2 and 3. All surfaces of the shield exposed to the child are provided with padded material.

The generally horizontal portion of the shield 12 is shaped around a rigid form 22. It can be seen from the cross-sectional view of FIG. 3 that the form 22 is molded to present a rounded surface to form an impact cushion 24 for the upper body of the child.

The generally vertical portion of the shield 12 forms the crotch piece 14. The crotch piece 14 includes the hollow, rigid crotch column 26 which separates the legs of a child seated in the car seat, and is the housing for the lock mechanism, generally designated as 28.

The shield 12 is adjusted to accommodate a larger child by varying the distance between the shield 12 and the chair back 10. This adjustment is accomplished by the cooperation of the side mounts 16 of the shield 12, and the lock positions of the crotch piece 14 into the chair bottom 4.

The shield 12 rotates about the side mounts 16 above the top of the chair back 10 to the position shown in broken lines in FIG. 1. This leaves the chair area completely free of any straps or obstructions to facilitate placement of the child in the car seat. The side mounts 16 can be provided with springs so that the shield biases into the open position when the crotch piece 14 is not locked to the chair bottom 4. By springing open when the shield 12 is unlocked, it is readily apparent when the restraint system is not secured.

In the preferred embodiment of the invention, the shield is rotatably mounted at the side mounts 16 to the frame 1 via a tubular member 20 which is L-shaped along the side portions of the chair 8 and forms a U-shaped frame within the generally horizontal portion of the shield 12.

An enlarged isometric sectional view of one side mount 16 is provided in FIG. 4. Slotted bracket 42 is mounted to the framework 1 and side of the chair 8. The slot 46 is keyholed shaped in that it terminates at either end in enlarged circular portions 46a and 46b which are the locking positions. The shaft of nut 36 passes through slot 46 and an opening in the tube member 20. A spring 38 assures that the tube member 20 is biased outwardly away from the frame 1. A housing 44 encloses the spring 38. To adjust the position of the side mount, the cap 40 about the tube member 20 and shaft 36 is depressed to compress the spring 38 so that a narrower portion of the nut shaft 36 allows the tube member 20 and shaft 36 to be moved in the direction of the slot 46 until it engages with the appropriate locking posi- tion.

An extended winding 48 of spring 38 may also be used to bias the shield to the overhead position by acting on the tube member 20 as illustrated in FIG. 4.

The lock 28 in the crotch piece 14 of shield 12 may be operated with one hand acting upon the latch button 32. By moving the latch button in a vertically downward direction, the lock tongue 30 is forced into a locked position in an opening 50 in the chair bottom 4. Openings 50 are provided in the chair bottom 4 at varying distances from the chair back 10 to adjust in cooperation with the sliding adjustment of the side mounts 16.

Two shoulder harness straps 18 emanate through openings in the chair back 10 and terminate in the shield 12. The top ends of the straps are buckled securely to the frame 1 behind the chair 8. A plurality of openings in the chair back 10 are provided for threading the harness straps 18 to adjust for various heights of children.

The lower ends of the harness straps 18 are threaded past a knurled shaft 34 in the horizontal portion of the shield 12. While the crotch piece 14 is unlocked, the harness straps can be slidably adjusted along the shaft 34. The shaft 34 passes perpendicularly through the latch of the lock mechanism 28 such that when the latch button 32 is moved vertically downwardly, the knurled surface of the shaft 34 clamps against the webbing of the harness straps 18 such that the straps 18 are no longer slidably adjustable. Thus, when the crotch piece 14 is locked to the chair bottom 4 by the lock mechanism 28, the shoulder harness straps 18 are fixed in place.

The method of using the passive restraint system of the car seat should be obvious from the explanation thus far given. To load a child into the open car seat, the child is placed in the chair 8. The shoulder harness straps 18 are pulled relatively taut, and the shield 12 is rotated to the front of the child. In so doing, the shoulder harness straps 18 will extend to adjust to fit the child's body. The crotch piece 14 is placed between the child's legs and the latch button 32 is moved vertically downward to lock the shield 12 into an appropriate opening 50 in the chair bottom 4. By locking the shield 12, the shoulder harness straps 18 are clamped into a locked position so that sliding of the straps along the knurled shaft 34 is no longer permitted. In the event that the lock 28 is not properly engaged with the chair bottom 4, the spring 38 in side mounts 16 will bias the shield into the open position to indicate that it must be properly locked.

Other alternative embodiments which achieve equivalent features of the present invention would be apparent to those skilled in the art. From the above description, it is intended that this disclosure be taken in an exemplary sense, and the scope of protection afforded be determined by the appended claims.

What is claimed is:

1. A child's car seat restraining system for use with a chair structure having a back, bottom, and a rigid shield member including a generally horizontal frontal restraint barrier, and a pair of generally L-shaped side arms; the improvement comprising means for rotatably mounting each of said side arms of said shield member to respective sides of the chair back, said mounting means comprising a bolt passing perpendicularly through each said side arm and respective sides of said chair back, whereby said side arms and said bolts rotate said shield member relative to the chair structure, said mounting means further comprising a side bracket fixedly mounted to respective sides of said chair back, each of said slide brackets including an elongated slot having enlarged sections separated by a connecting passage, defining a first and a second shield position, said slots slidably cooperating with said bolts passing through said side arms of said shield member to vary the distance between the chair back and said frontal restraint barrier.

2. The car seat restraining system of claim 1, wherein said bolt comprises a first section of enlarged diameter sized to fit within said enlarged openings of said slot and a second section of sufficiently small diameter to travel along said connecting passage; and a spring biasing said first section of said bolt into said slot.

3. The car seat restraining system of claim 2, wherein one end of said spring is fixed to said side arm such that said fixed end of said spring means biases said shield member towards a position rotated about said bolt above the occupant's head.

* * * * *